US009665993B2

(12) United States Patent
Amirpour et al.

(10) Patent No.: US 9,665,993 B2
(45) Date of Patent: May 30, 2017

(54) MOBILE COMMUNICATION INTERFACE, SYSTEM HAVING A MOBILE COMMUNICATION INTERFACE, AND METHOD FOR IDENTIFYING, DIAGNOSING, MAINTAINING, AND REPAIRING A VEHICLE

(75) Inventors: Ramon Amirpour, Ebersbach (DE); Guenter Nobis, Nuertingen (DE); Roger Malmsheimer, Allmersbach Im Tal (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 14/000,023

(22) PCT Filed: Jan. 9, 2012

(86) PCT No.: PCT/EP2012/050228

§ 371 (c)(1), (2), (4) Date: Oct. 25, 2013

(87) PCT Pub. No.: WO2012/110262

PCT Pub. Date: Aug. 23, 2012

(65) Prior Publication Data

US 2014/0074344 A1 Mar. 13, 2014

(30) Foreign Application Priority Data

Feb. 16, 2011 (DE) ........................ 10 2011 004 207

(51) Int. Cl.
*G01M 17/00* (2006.01)
*G06F 17/30* (2006.01)
(Continued)

(52) U.S. Cl.
CPC ........... *G07C 5/008* (2013.01); *G07C 5/0808* (2013.01)

(58) Field of Classification Search
None
See application file for complete search history.

(56) References Cited

U.S. PATENT DOCUMENTS

2002/0161495 A1* 10/2002 Yamaki ........................... 701/33
2004/0083041 A1* 4/2004 Skeen et al. ..................... 701/35
(Continued)

FOREIGN PATENT DOCUMENTS

CN 1543622 11/2004
CN 1664541 9/2005
(Continued)

OTHER PUBLICATIONS

Machine translation of JP 10-253502.*

*Primary Examiner* — John R Olszewski
*Assistant Examiner* — Navid Ziaeianmehdizade
(74) *Attorney, Agent, or Firm* — Norton Rose Fulbright US LLP; Gerard Messina

(57) ABSTRACT

A method for identifying, diagnosing, maintaining, and repairing a vehicle in a repair shop, including the steps of connecting a mobile communication interface (VCI) to the vehicle and connecting a first vehicle inspection device at least to the VCI at a first work station; detecting identification data for the vehicle using the first vehicle inspection device and storing the identification data for the vehicle in the VCI; carrying out the first set of inspections of the vehicle using the first vehicle inspection device and/or the VCI; disconnecting the first vehicle inspection device from the vehicle; connecting a second vehicle inspection device to the vehicle, reading out the identification data from the VCI into the second vehicle inspection device at a second work station, and carrying out a second set of inspections of the vehicle using the second vehicle inspection device and/or the VCI connected to the vehicle.

7 Claims, 5 Drawing Sheets

(51) Int. Cl.
*G07C 5/00* (2006.01)
*G07C 5/08* (2006.01)

(56) References Cited

U.S. PATENT DOCUMENTS

| | | | | |
|---|---|---|---|---|
| 2005/0192722 | A1* | 9/2005 | Noguchi | 701/35 |
| 2009/0216584 | A1* | 8/2009 | Fountain et al. | 705/7 |
| 2009/0265055 | A1* | 10/2009 | Gillies | 701/29 |
| 2009/0276115 | A1* | 11/2009 | Chen | 701/32 |
| 2011/0118933 | A1* | 5/2011 | Sakai et al. | 701/33 |
| 2013/0226394 | A1* | 8/2013 | Amirpour et al. | 701/31.4 |
| 2013/0238670 | A1* | 9/2013 | Amirpour et al. | 707/812 |
| 2013/0246135 | A1* | 9/2013 | Wang | 705/14.4 |
| 2014/0052329 | A1* | 2/2014 | Amirpour et al. | 701/29.6 |
| 2014/0188331 | A1* | 7/2014 | Amirpour et al. | 701/31.4 |

FOREIGN PATENT DOCUMENTS

| | | | |
|---|---|---|---|
| DE | 44 46 512 | | 6/1996 |
| DE | 199 21 846 | | 11/2000 |
| JP | 10-253502 | * | 9/1998 |
| JP | 10 253502 | | 9/1998 |
| JP | 3795552 | | 7/2006 |
| JP | 3345827 | | 9/2006 |

* cited by examiner

MOBILE COMMUNICATION INTERFACE, SYSTEM HAVING A MOBILE COMMUNICATION INTERFACE, AND METHOD FOR IDENTIFYING, DIAGNOSING, MAINTAINING, AND REPAIRING A VEHICLE

FIELD OF THE INVENTION

The present invention relates to a mobile communication interface, a system having a mobile communication interface, and a method for identifying, diagnosing, maintaining, and repairing a vehicle via a mobile communication interface, in particular in a motor vehicle repair shop.

BACKGROUND INFORMATION

The publication DE 44 46 512 A1 discusses a device for carrying out a vehicle check using a mobile wireless part which relays diagnostic data from a vehicle to a repair shop.

The publication DE 199 21 846 A1 discusses a diagnostic test device having a portable inspection device for motor vehicles.

The technical development of motor vehicle inspection technology has resulted in a plurality of specific external inspection devices for different inspection fields and motor vehicle components. The vehicle inspection devices used for this purpose are highly specialized and adapted to the corresponding vehicle components. Vehicle inspection devices are frequently used at special work stations in a repair shop or an inspection site, for example, since the vehicle inspection devices are installed fixedly in the repair shop. A vehicle which is present in the repair shop for error diagnosis and/or repair is moved from work station to work station, depending on the inspection or repair to be performed.

In today's motor vehicles, many functions are carried out by electronic control units which are connected to the vehicle electronics system. The electronic control units often also take over the on board diagnostic functions of the vehicle systems and store special diagnostic and/or operating mode data. To be able to evaluate the data of the diagnostic functions from the control units, universal diagnosis testers have been developed which enable a communication with the control units present in the vehicle. The functionality of the communication may vary greatly and relates, for example, to reading out stored error codes, relaying actual values, carrying out complex actuator tests, resetting service intervals, breaking in installed replacement parts, and similar tasks.

Diagnosis testers usually include in this case an assembly which is responsible for the communication with the vehicle. Most of the time, this assembly is used as a vehicle communication interface (VCI). VCIs of this type may also be situated in their own housing and communicate with universal operating and display devices, such as laptops, PDAs, or smart phones, via wired or wireless transmission. The diagnostic functionality of universal diagnosis testers or operating and display devices is in this case ensured via a corresponding diagnosis software which enables the operation, the display, the diagnosis sequence control, and the communication with the electronic control units via the VCI.

The specialization of the vehicle inspection devices currently usually requires the combination of individual inspection and repair steps with communication steps and the evaluation of the data in the electronic control units.

Two basic approaches, which are schematically shown in FIGS. 6 and 7, have been established so far in the design of the inspection devices and repair shop visits.

FIG. 6 shows a vehicle 61 in a repair shop. Vehicle 61 includes here one or multiple electronic control units 62 which are installed in vehicle 61. During an inspection or repair sequence in a repair shop, vehicle 61 is moved to different work stations 65*a*, 65*b*, and 65*c* which may be spatially separated from one another. At each of work stations 65*a*, 65*b*, 65*c*, a specific vehicle inspection device or a universal operating and display device 64*a*, 64*b*, 64*c* is present which is assigned to the particular work station. Specific vehicle inspection devices 64*a*, 64*b*, 64*c* may be connected for inspection purposes to the components of vehicle 61, e.g., the exhaust, the engine, the air conditioner, or other components. At each work station, a universal diagnosis tester 63 associated with particular work station 65*a*, 65*b*, 65*c* is additionally provided using which the communication with electronic control units 62 of vehicle 61 is established via a not illustrated standardized vehicle interface. Alternatively, the repair shop has only one universal diagnosis tester 63 which is moved from work station to work station as needed.

During a repair shop visit of vehicle 61, it is necessary that particular universal diagnosis tester 63 of each work station 65*a*, 65*b*, 65*c* is connected to the not illustrated standardized vehicle interface. The operation of diagnosis tester 63 and of particular vehicle inspection device 64*a*, 64*b*, 64*c* take place separately. This may lead to manual input errors by the users of the devices. Moreover, a certain amount of additional time and effort is required for the repeated identification of vehicle 61 at each of work stations 65*a*, 65*b*, 65*c* by diagnosis tester 63.

FIG. 7 shows a different approach: A vehicle 71 having one or multiple installed electronic control units 72 is taken to work stations 75*a*, 75*b*, 75*c* in a repair shop. There is a specific vehicle inspection device 74*a*, 74*b*, 74*c* at each of work stations 75*a*, 75*b*, 75*c*. Each of specific vehicle inspection devices 74*a*, 74*b*, 74*c* includes an integrated VCI 73*a*, 73*b*, 73*c* with the aid of which a communication is established with electronic control units 72 in vehicle 71 via a not illustrated standardized vehicle interface. For this reason, the operation of a separate universal diagnosis tester in parallel to the vehicle inspection device, as in Figure 6, is dispensed with. Furthermore, a separate identification of vehicle 71 is, however, necessary at different work stations 75*a*, 75*b*, 75*c* by particular integrated VCI 73*a*, 73*b*, 73*c*. Moreover, particular vehicle inspection devices 74*a*, 74*b*, 74*c*, in particular their inspection device software, must be adapted to integrated VCIs 73*a*, 73*b*, 73*c*. At a work station without a specific vehicle inspection device, a universal diagnosis tester having an integrated VCI may then be used.

SUMMARY OF THE INVENTION

The present invention is based on carrying out the identification of a vehicle, which is necessary for a plurality of work steps in a repair shop or inspection site, only once at the beginning of the repair shop visit or the inspection site visit. As soon as the vehicle has been identified once with the aid of unambiguous identification data, the unambiguous identification data are stored in the VCI connected to the vehicle and are moved along with the vehicle from work station to work station. For this purpose, the VCI remains in the particular vehicle until the end of the repair shop visit.

During the repair shop visit, vehicle inspection devices and/or universal operating and display devices present at the particular work stations may initiate a communication with the VCI of the vehicle present at the work station, retrieve the unambiguous identification data of the vehicle, and, for example, exchange the diagnosis information with the vehicle control units. This saves the particular user of the vehicle inspection device and/or of the universal operating and display device from installing and uninstalling the VCI as well as the time needed for a complex identification of the vehicle and for establishing the communication with the control units installed in the vehicle. In this way, the vehicle inspection and/or the error diagnosis may be started faster, on the one hand, and errors maybe avoided which occur during the manual vehicle detection, on the other hand.

The method according to the present invention for identifying, diagnosing, maintaining, and repairing a vehicle in a repair shop according to claim 1 includes here connecting a mobile communication interface (VCI) and a first vehicle inspection device to the vehicle at a first work station, establishing a communication connection between the VCI and the first vehicle inspection device, establishing a communication connection between the VCI and the electronic control units in the vehicle, identifying the vehicle for diagnosis purposes, in particular for the control unit communication, storing the identification data for the vehicle in the VCI, carrying out a first set of inspections of the vehicle using the first vehicle inspection device and/or the VCI, disconnecting the first vehicle inspection device from the vehicle, and connecting a second vehicle inspection device to the vehicle at a second work station, reading out the identification data from the VCI into the second vehicle inspection device, and carrying out a second set of inspections of the vehicle using the second vehicle inspection device and/or the VCI.

Unambiguous identification and/or diagnostic data of the vehicles present in the repair shop and provided with VCIs may be displayed to the user of the particular first and the second vehicle inspection devices at the first and the second work stations, respectively. It is particularly advantageous when the display of the unambiguous identification data at the particular first or second work station takes place as a function of the proximity of the particular vehicle to the work station. In this way, a preselection of the vehicles in question which are close to the particular work station is made from all the vehicles presently present in the repair shop, thus minimizing the risk of erroneous identification.

According to another specific embodiment according to the present invention, a VCI is provided for identifying, diagnosing, maintaining, and repairing a vehicle in a repair shop having a connecting device which is configured to connect a VCI to a standardized vehicle interface of a vehicle in a repair shop, a memory device which is configured to additionally store unambiguous identification data of the vehicle to be identified and connected, and a communication device which is configured to control the VCI of inspection devices in the repair shop and to relay identification and diagnostic data of the connected vehicle to the inspection devices in the repair shop.

According to another specific embodiment according to the present invention, a system is provided for identifying, diagnosing, maintaining, and repairing a vehicle in a repair shop having a VCI according to the present invention and a plurality of vehicle inspection devices, each having different vehicle inspection modules, and a diagnostic server device for establishing a communication with the VCI, an operating and display device of the vehicle inspection device for controlling the vehicle inspection modules and the VCI, and different vehicle inspection modules which are configured to carry out inspection-device specific vehicle inspections of the vehicle based on the identification and diagnostic data and the diagnostic results of the specific vehicle inspection modules.

Refinements are the subject matter of the particular subclaims.

The above-mentioned embodiments and refinements may be combined in any desired manner, provided that the combination is reasonable. Other possible embodiments, refinements, and implementations of the present invention also include not explicitly named combinations of features of the present invention described previously or in the following with regard to the exemplary embodiments.

Further features and advantages of specific embodiments of the present invention result from the following description with reference to the appended drawings.

DETAILED DESCRIPTION

Figure 1:
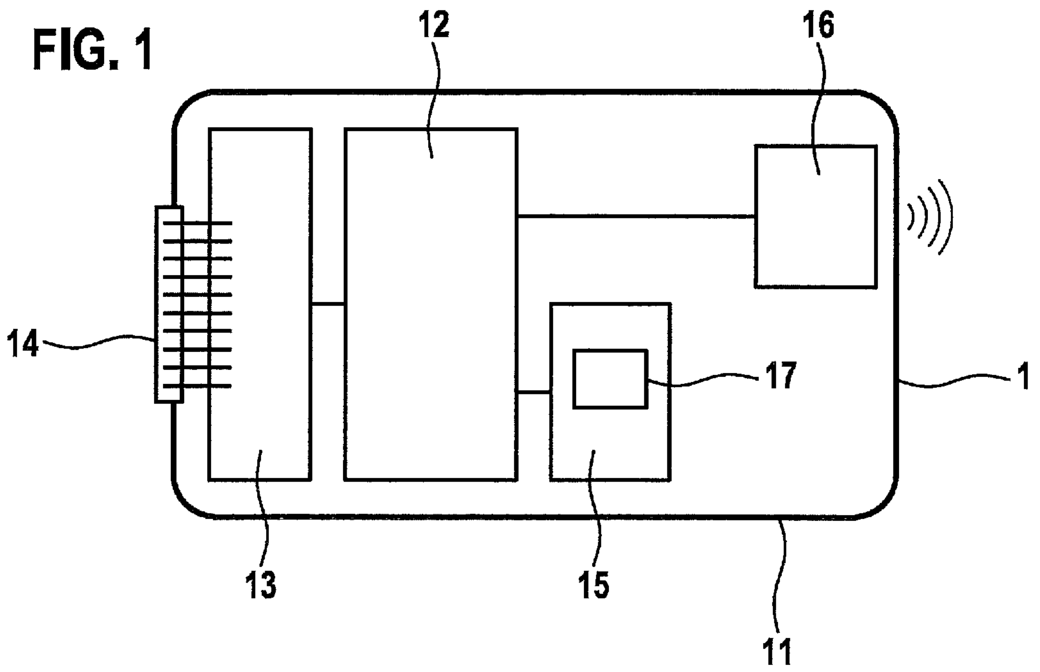
FIG. 1 shows a schematic representation of a VCI according to one specific embodiment of the present invention.

In the figures of the drawings, elements, features, and components which are identical or have identical functions are each identified with identical reference numerals, unless otherwise indicated. It is understood that the components and elements in the drawings are not necessarily true to scale to one another for the sake of clarity and comprehensibility.

In the context of this application, the vehicle inspection devices are not limited to specific vehicle inspection devices. They may, for example, include axle measurement testers, engine testers, emission testers, brake testers, shock absorber testers, track testers, weighing devices, brake fluid testers, sound level meters, diesel exhaust gas testers, chassis measuring devices, toe angle measuring devices, steering angle testers, air conditioner testing devices, and the like. These vehicle inspection devices maybe used in repair shops, in particular motor vehicle repair shops, inspection sites, or similar facilities. In particular, the methods and devices according to the present invention are also usable in these facilities.

In the following, communication interfaces for vehicles are described which are referred to as vehicle communication interfaces, in short VCI, in the sense of this application.

In particular, these communication interfaces are mobile interfaces which may be moved along with the vehicle in a repair shop from work station to work station.

Figure 8:
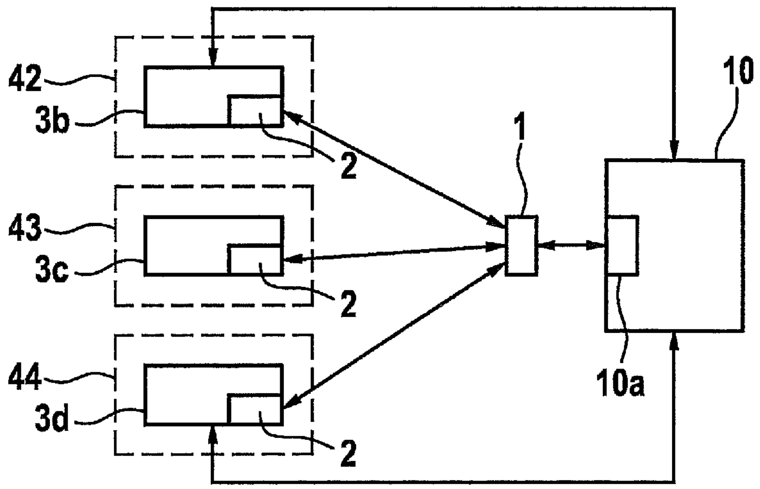
FIG. 8 shows a schematic representation of a vehicle inspection device set-up in a repair shop according to one specific embodiment of the present invention.

FIG. 8 shows a schematic representation of a vehicle inspection device set-up in a repair shop according to one specific embodiment of the present invention.

A vehicle 10, in particular a motor vehicle, includes one or multiple electronic control units 10a. Electronic control unit(s) 10*a* may include specific control units for specific vehicle components or universal electronic control units 10*a* of vehicle 10. Electronic control units 10*a* may have available diagnostic data, error data, actual values, operating mode data, or similar data, which are relevant to the vehicle, for specific vehicle components via a not illustrated standardized vehicle interface and may be transferred into certain operating modes or sequences.

Electronic control unit(s) 10*a* is/are connected to a VCI 1 via a not illustrated standardized vehicle interface. VCI 1 may be connected to vehicle 10 at the beginning of a repair shop visit, e.g., at the vehicle drop-off. VCI 1 may be configured to store unambiguous identification data of vehicle 10, e.g., the vehicle owner, the license plate number, the vehicle make, the vehicle manufacturer, the chassis number, or similar identification data. The unambiguous identification data may in this case be reentered at the vehicle drop-off of the repair shop with the aid of a universal operating and display device or retrieved from a previous repair shop visit from a central repair shop data base.

VCI 1 is configured to be moved along with vehicle 10 in the repair shop when vehicle 10 is moved through work stations 41, 42, 43, 44. At work stations 41, 42, 43, 44, specific vehicle inspection devices or universal operating and display devices 3*a*, 3*b*, 3*c* are located which are equipped with a standardized diagnostic server device 2. Diagnostic server device 2 is configured in each case to establish a communication with VCI 1 and thus with electronic control unit(s) 10*a* of vehicle 10. In this case, specific vehicle inspection devices 3*a*, 3*b*, 3*c* maybe connected at every work station to the particular vehicle components of vehicle 10 to carry out the diagnosis and/or repair work of vehicle 10.

FIG. 1 shows a schematic representation of a VCI 1 according to one specific embodiment of the present invention. VCI 1 is situated in a housing 11 and includes a microprocessor 12, a connecting device 13 having a plug connector 14 for connecting VCI 1 to a standardized vehicle interface in a vehicle, a memory device 15 for storing unambiguous identification data of the vehicle to be connected, and a communication device 16 for establishing a communication connection to diagnostic server devices 2 of specific vehicle inspection devices.

Microprocessor 12 is configured to evaluate control instructions for VCI 1 and to control connecting device 13, memory device 15, and communication device 16. Microprocessor 12 may naturally also include a microcontroller, an ASIC, or a similar device.

Connecting device 13 may be configured to provide, at a lower communication layer, in particular a bit transmission layer ("physical layer"), interfaces for diagnosis bus systems of the vehicle to be connected. Electronic control units of the vehicle may be addressed via the diagnosis bus systems.

Memory device 15 may have a relatively large memory volume in comparison to conventional VCIs in order to provide an appropriate amount of memory space for the unambiguous identification data of the vehicle and to store the configuration data of microprocessor 12, connecting device 13, and communication device 16. Memory device 15 includes corresponding software 17 which is specific for the operation of VCI 1. Software 17 is described in greater detail below for FIG. 2.

Communication device 16 is configured to establish a communication connection with diagnostic server device 2 of specific vehicle inspection devices. For this purpose, communication device 16 may have an arrangement for establishing a wired or wireless connection, e.g., a wireless module for Bluetooth or WLAN, an infrared interface, an RFID transponder, or the like.

VCI 1 does not include any operation or display elements in the present example. The operating and display elements may, for example, be provided via the vehicle inspection devices to be connected to VCI 1 or via universal operating and display devices. It may naturally also be possible to equip VCI 1 with its own operating and display elements.

Figure 2:
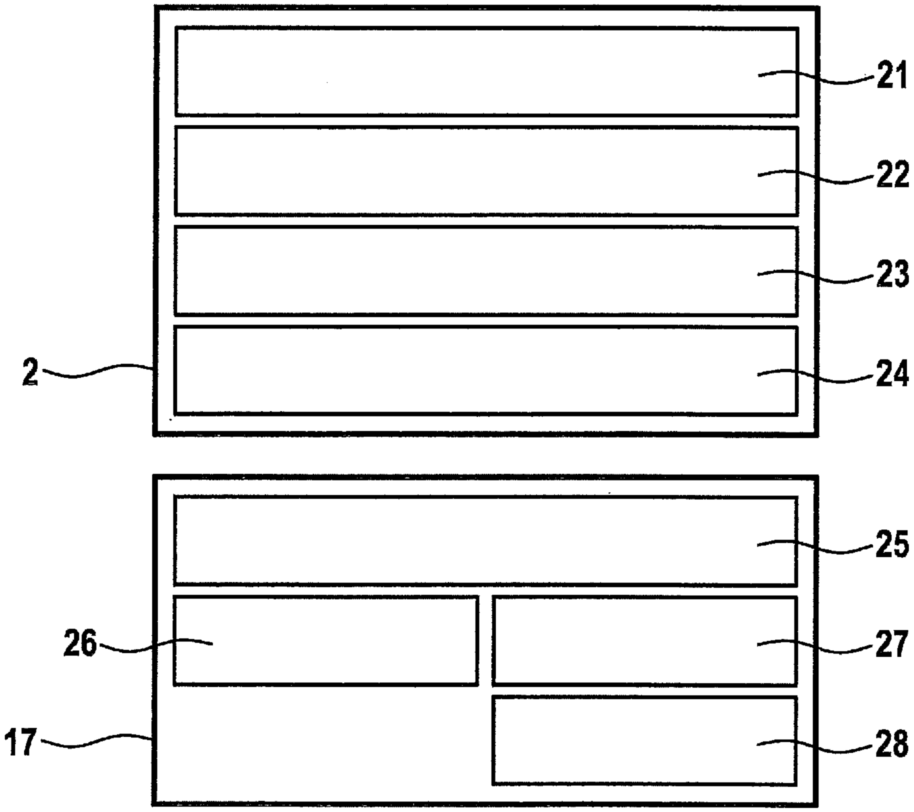
FIG. 2 shows a schematic representation of the software architecture of a VCI and of a diagnostic server device according to another specific embodiment of the present invention.

FIG. 2 shows a schematic representation of the software architecture of a VCI, in particular of VCI 1, and of a diagnostic server device 2 according to another specific embodiment of the present invention.

In this case, software 17, which may be stored in a memory device 15 of VCI 1 from FIG. 1, includes a first communication layer 25, a memory software 26, a protocol software 27, and a second communication layer 28. Individual software components 25, 26, 27, and 28 may be combined in a software code. It is also possible for software 17 to have additional software components.

First communication layer 25 is configured to establish a communication with a communication layer 24 of a diagnostic server device 2 and to control the VCI. Memory software 26 is configured to receive, store, and manage the unambiguous identification data for vehicle 10. The unambiguous identification data may be kept for the duration of a repair shop stay of vehicle 10 and, if necessary, output via diagnostic server device 2 to the specific vehicle inspection devices.

Protocol software 27 is configured to provide the necessary protocols of the communication with vehicle 10 and/or diagnostic server device 2. Second communication layer 28 is configured to control the communication connections established with the control units in vehicle 10 via connecting device 13 in FIG. 1.

Diagnostic server device 2 includes as software components a communication layer 21, a software interface 22, a diagnostic server software 23, and a second communication layer 24.

Second communication layer 24 may be used for communicating with first communication layer 25 of software 17 of VCI 1. Second communication layer 24 of diagnostic server device 2 may furthermore be configured to register which VCI 1 is located in the range of the vehicle inspection device containing diagnostic server device 2. This information may change dynamically with the movement of a plurality of vehicles provided with VCI 1 within a repair shop. In particular, VCIs 1 may be configured via communication devices 16 to display their presence via beacon signals to particular diagnostic server devices 2 in a repair shop. Here, the range of VCIs 1 may be predetermined.

First communication layer 21 of diagnostic server device 2 may be configured to provide an interface for specific vehicle inspection devices, in particular for the vehicle inspection device into which diagnostic server device 2 is integrated. First communication layer 21 may be configured to provide functions of the control unit communication. This includes, for example, reading out errors, actual values, operating mode data, deleting and overwriting values in control units, e.g., of service intervals, error registers, actuator activations, carrying out complex inspection sequences such as a steering angle calibration, an ABS sensor inspection, a pump inspection, a brake circuit bleeding, and the like. First communication layer 21 is furthermore configured to relay unambiguous vehicle identifications from the electronic control units of vehicle 10, to be connected, to the specific vehicle inspection devices and the VCI. First communication layer 21 may in this case be adapted to the specific vehicle inspection device, e.g., using a preconfigured inspection device parameter set which may be retrieved from the vehicle inspection device.

Figure 3:
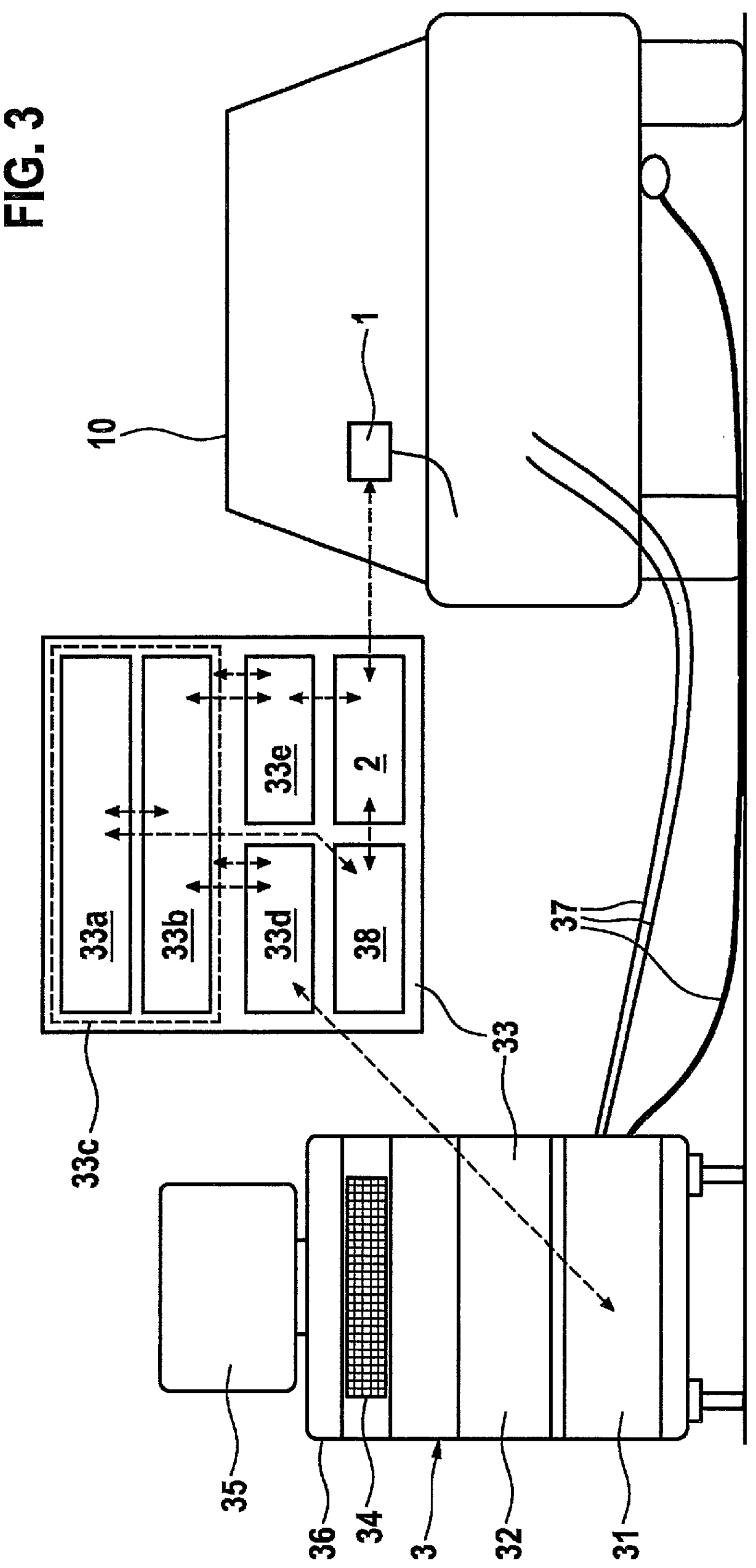
FIG. 3 shows a schematic representation of the setting of a repair shop work station having a system according to another specific embodiment of the present invention.

FIG. 3 shows a schematic representation of the setting of a repair shop work station having a system according to another specific embodiment of the present invention.

A vehicle 10 is shown to which a VCI 1 according to FIG. 1 is connected. Vehicle 10 is located at a work station in a repair shop or inspection site at which a corresponding vehicle inspection device 3 is present. Vehicle inspection device 3 includes an inspection module 31, a control computer 32 having control software 33, an operating device 34, and a display device 35. Vehicle inspection device 3 may be connected to vehicle 10 or to the vehicle components of vehicle 10, such as the exhaust, the engine, the air conditioner, the braking system, or the like, via a cable, sensors, hoses, and a similar suitable connecting arrangement 37. Vehicle inspection device 3 may be situated in a housing 36. Vehicle inspection device 3 may be accommodated in a trolley, for example, or fixedly connected to the repair shop floor at the work station.

Inspection module 31 may have a specific vehicle inspection module which may carry out predefined inspections or a diagnosis with regard to certain vehicle components of vehicle 10, e.g., engine tests, chassis measurement, air conditioning service, or the like. Control computer 32 may be configured to control the corresponding specific functions of inspection module 31 with the aid of control software 33.

Control software 33 is shown in the offset box in FIG. 3 in larger detail. Control software 33 includes a software layer 33*a* for operating vehicle inspection device 3 as well as for visualizing the inspection sequences and results, a software layer 33*b* for controlling the inspection sequences, a first communication layer 33*d*, which establishes a communication between the inspection sequence control through software layer 33*b* and inspection module 31, a second communication layer 33*e*, which establishes a communication of the inspection sequence control through software layer 33*b* and of diagnostic server device 2, a diagnostic server device 2 according to FIG. 2 as well as a detection software component 38.

Software layers 33*a* and 33*b* for operation, display, and inspection sequence control may also be integrated into a joint software layer 33c. Second communication layer 33*e* may have a software component for communicating with the user, a software component for establishing a communication with diagnostic server device 2, a software component for the communication of the inspection sequence control with diagnostic server device 2 during an inspection sequence, and an inspection device parameter set.

Communication layer 33*e* may be configured to display a list of vehicles 10, whose VCI 1 is in the range of diagnostic server device 2 or the particular work station, to a user of vehicle inspection device 3 via display unit 35. In this way, the user may select the correct vehicle via operating device 34 from the list of vehicles 10 in question. By selecting a vehicle 10 on a vehicle inspection device 3, corresponding VCI 1 maybe blocked for selection at other work stations or using other vehicle inspection devices. Thus, errors may be advantageously prevented during the vehicle selection process.

At the beginning of the actual inspection sequence in the previous work steps of the repair shop visit, communication layer 33*e* may receive already stored identification data from VCI 1 of vehicle 10 and relay them to software layer 33*b* for inspection sequence control. In this way, the inspection sequence may advantageously be adapted automatically to vehicle 10. During the inspection sequence, communication layer 33*e* may also activate functions in the electronic control units of vehicle 10 and dynamically relay diagnostic data from the electronic control units of vehicle 10 to software layer 33*b* during the inspection sequence.

Communication layer 33*e* may furthermore advantageously receive preconfigured parameters of specific inspection module 31 to activate or deactivate in a targeted manner certain functions of the electronic control units of vehicle 10. In this way, the functionality scope of the electronic control units, which is usually large, may be reduced to the functions needed for the particular inspection sequence in order to avoid errors by the user during the operation of vehicle inspection device 3.

Detection software component 38 may be configured to manage all VCIs 1, presently used in the repair shop or inspection site, and their connected vehicles 10. Furthermore, detection software component 38 may be configured to detect and store in VCI 1 unambiguous identification data of the vehicle such as owner, license plate number, chassis number, and the like. It is not necessary that detection software component 38 is provided in every vehicle inspection device 3, but it is also possible to equip only one of the vehicle inspection devices in a repair shop, which may be an inspection device at the vehicle drop-off, with detection software component 38. It may furthermore be possible to provide a universal operating and display device, e.g., a laptop, a PDA or a smart phone, with detection software component 38 instead of a vehicle inspection device 3.

Figure 4:
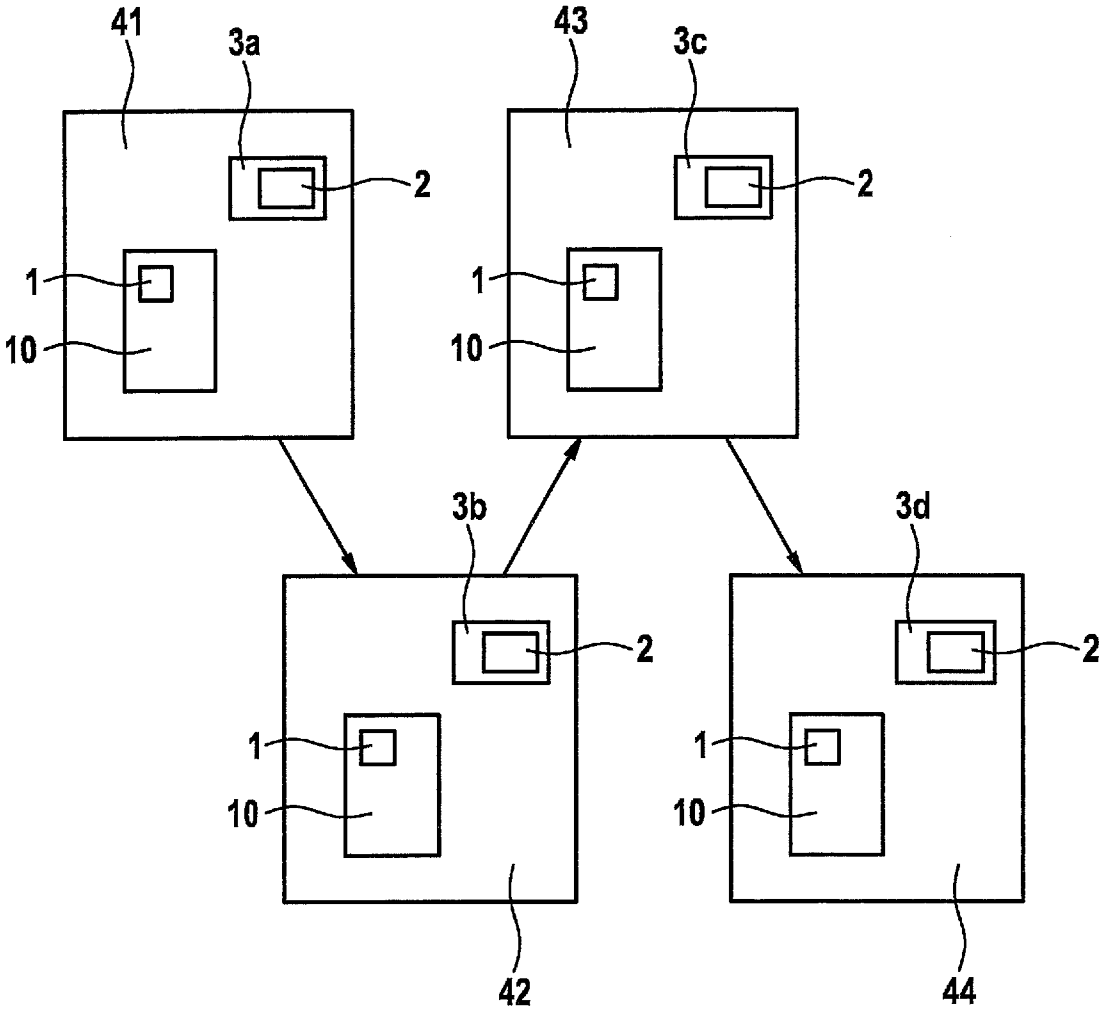
FIG. 4 shows a schematic representation of a method for identifying, diagnosing, maintaining, and repairing a vehicle in a repair shop via a VCI according to another specific embodiment of the present invention.
Figure 5:
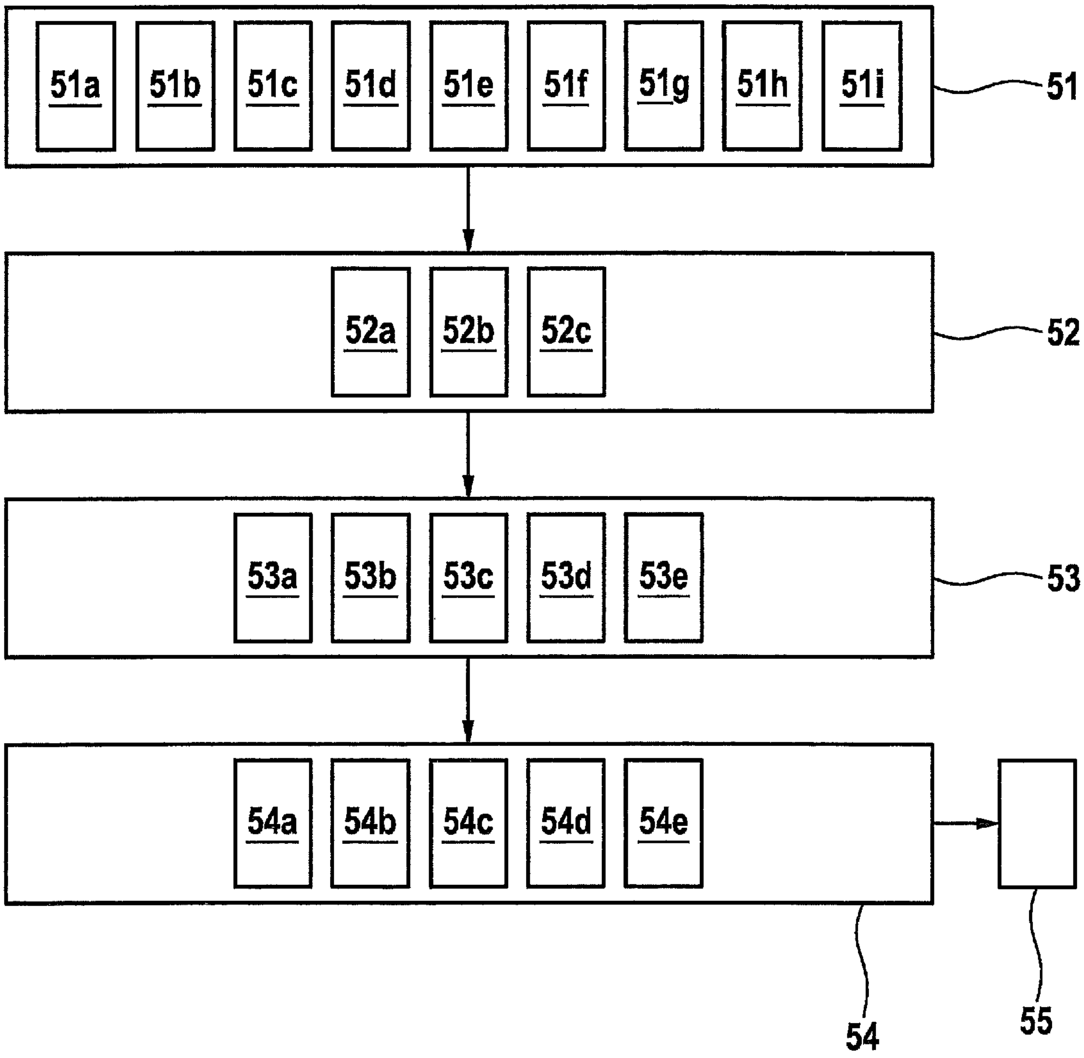
FIG. 5 shows a schematic representation of a method for identifying, diagnosing, maintaining, and repairing a vehicle in a repair shop via a VCI according to another specific embodiment of the present invention.
Figure 6:
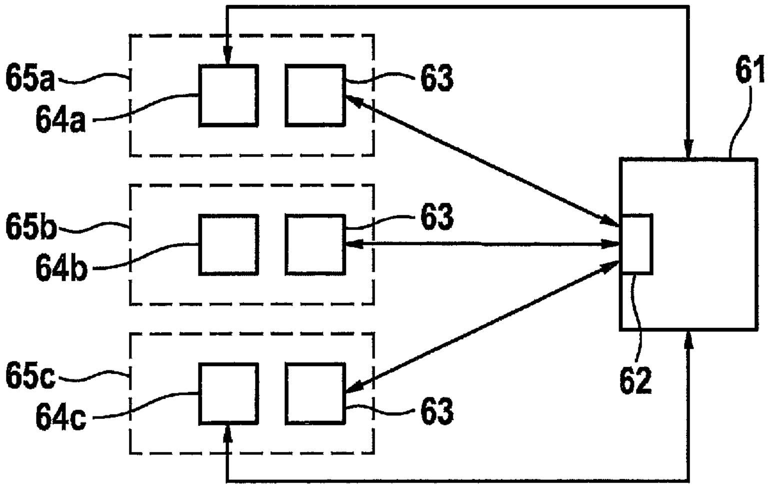
FIG. 6 shows a schematic representation of a conventional vehicle inspection device set-up in a repair shop.
Figure 7:
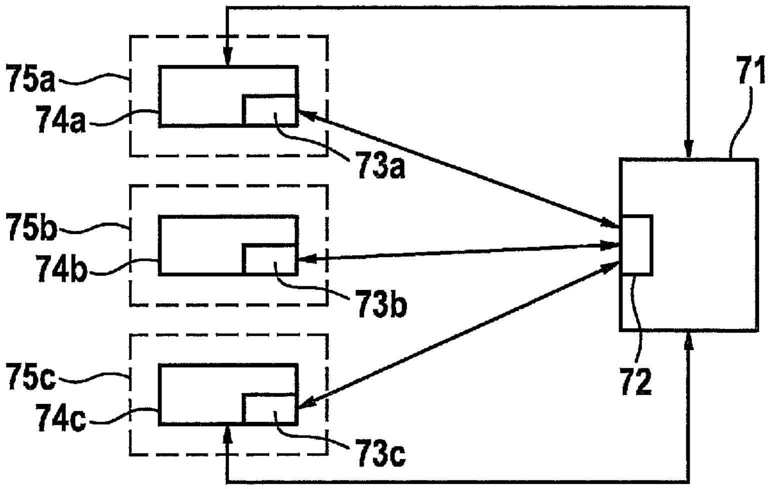
FIG. 7 shows a schematic representation of another conventional vehicle inspection device set-up in a repair shop.

FIG. 4 shows a schematic representation of a method for identifying, diagnosing (inspecting), maintaining, and repairing a vehicle 10 in a repair shop using a VCI 1 according to FIG. 1 according to another specific embodiment of the present invention. The sequence of the method according to FIG. 4 is explained in greater detail with reference to the steps of the schematic representation, shown in FIG. 5, of a method for identifying, diagnosing, maintaining, and repairing a vehicle in a repair shop via a VCI 1 according to another specific embodiment of the present invention.

After incorporating the customer or vehicle data into the repair shop system (step 51*a*) and requesting the error symptoms from the customer (step 51*b*), vehicle 10 to be maintained or repaired is connected to a VCI 1 (step 51*c*) at a first work station 41, e.g., the vehicle drop-off of a repair shop. At first work station 41, a first vehicle inspection device 3*a* may be provided which is equipped with a standardized diagnostic server device 2. First vehicle inspection device 3*a* may, for example, be a universal operating and display device which is used for a rapid diagnostic test of vehicle 10. At first work station 41, unambiguous vehicle identification data are furthermore ascertained (step 51*e*) in addition to entering the vehicle or the customer into the vehicle inspection device or the universal operating and display device 3*a* (step 51*d*) and relayed to VCI 1, in which the identification data are stored (step 51*f*) at least for the duration of the repair shop visit, via vehicle inspection device 3*a* having diagnostic server device 2. For this purpose, a detection software component 38, as shown in FIG. 3, may be stored in a control computer of vehicle inspection device 3*a*. Furthermore, it is, for example, possible to carryout (step 51*g*) a rapid diagnostic test using VCI 1, after the completion of which a result protocol is printed (step 51*h*), by detecting all error storage inputs in the electronic control units of vehicle 10. Subsequently, the repair shop order may be discussed with the customer (step 51*i*).

Then, vehicle 10 is moved to a second work station 42 within the repair shop. VCI 1 is not disconnected from vehicle 10 during this process and is moved along with vehicle 10. Second work station 42 may, for example, be a work station for diagnosing and troubleshooting (step 52). At second work station 42, there is a second vehicle inspection device or a universal operating and display device 3*b* having an integrated diagnostic server device 2. Second vehicle inspection device 3*b* establishes a communication with VCI 1 and reads out automatically the stored unambiguous identification data from VCI 1. For troubleshooting (step 52*a*), it may be provided that additional special diagnosis steps for troubleshooting are carried out on vehicle 10 at second work station 42 using VCI 1 and vehicle inspection device 3*b* depending on the error symptoms (step 51*b*) indicated by the customer or on the results of the rapid diagnostic test (step 51*g*). For example, an erroneous steering angle sensor may be identified (step 52*b*) in the process and a result protocol is again prepared (step 52*c*) after the troubleshoot.

Subsequently, vehicle 10 is moved again together with VCI 1 to a third work station 43 having a third vehicle inspection device or a universal operating and display device 3*c*. Third work station 43 may in this case be a repair work station, for example. After procuring a replacement part (step 53*a*), a defective vehicle component, e.g., a defective steering angle sensor, may, for example, be uninstalled (step 53*b*) and replaced by a replacement part (step 53*c*) at a third work station. With the aid of diagnostic server device 2, a communication with VCI 1 may be established via vehicle inspection device 3*c* and thus with one or multiple electronic control units in vehicle 10, so that the new steering angle sensor, for example, may be registered or broken in (step 53*d*) in the appropriate electronic control unit of vehicle 10. Subsequently, a result protocol is prepared again (step 53*e*).

After the repair, vehicle 10 is moved to a fourth work station 44 at which the vehicle geometry of vehicle 10 may be measured (step 54*a*) and the chassis may be set (step 54*b*), for example. For this purpose, a fourth vehicle inspection device 3*d*, e.g., an inspection device for chassis measurement, is provided at fourth work station 44. With the aid of the communication between fourth vehicle inspection device 4*d* and VCI 1, the newly installed steering angle sensor may be automatically calibrated (step 54*d*) by vehicle inspection device 3*d* after the completion of the chassis measurement and setting, since the necessary identification data of vehicle 10 are already present in VCI 1. The identification data of vehicle 10 may also already be used for preparing the measurement and setting of the chassis. After preparing a result protocol (step 54*e*), VCI 1 may be disconnected again from vehicle 10 (step 54*e*) upon completion of the repair shop visit. In a step 55, the repair shop order may then be completed, and the data and the result protocols of the repair shop visit may be stored in a central repair shop system for repeated use during a future repair shop visit of the customer or vehicle 10.

Many advantages result from using VCI 1 according to the present invention as well as the method according to the present invention for identifying, diagnosing, maintaining, and repairing a vehicle in a repair shop. The identification of the vehicle necessary for the control unit communication is carried out only once per repair shop visit and is expanded at individual work stations or by individual vehicle inspection devices only as needed. This results in saving a significant amount of time during the repair shop visit. Once detected, the vehicle identification data are equally available at every work station, since they are moved along with the vehicle from work station to work station via the VCI. The risk of operating errors or erroneous inputs during the identification of vehicles is also reduced, since, on the one hand, the identification data may be automatically retrieved from the VCI, and, on the other hand, every vehicle in the repair shop may be activated for processing only at a single work station. Specific vehicle inspection devices and universal operating and display devices may be equipped with a standardized diagnostic server device, and there is no need for a complex adaptation process to the particularities of the individual vehicle inspection device.

Depending on the functionality scope of the particular work station, the control software of the vehicle inspection device is able to only activate those functions during its communication with the electronic control units of the vehicle which are in fact needed for the particular work station. This enables a simple and advantageous handling of the particular specific vehicle inspection devices or universal operating and display devices at the specific work stations in the repair shop. The users of the vehicle inspection devices at the work stations will not need as many required qualifications when handling the control unit communication, since the communication between the electronic control units in the vehicle and the vehicle inspection devices may take place in the background and automatically to the greatest possible extent.

What is claimed is:

1. A method for identifying, diagnosing, maintaining, and repairing a vehicle in a repair shop, the method comprising:

connecting a mobile communication interface to the vehicle and connecting a first vehicle inspection device at least to the mobile communication interface at a first work station, wherein the mobile communication interface and the first inspection device are separate devices which are configured to be (i) selectively attached to one another and (ii) subsequently detached again;

detecting identification data for the vehicle using the first vehicle inspection device and storing the identification data for the vehicle in the mobile communication interface;

carrying out a first set of inspections of the vehicle using the first vehicle inspection device, wherein the first vehicle inspection device has at least a first vehicle inspection module, which performs inspection-device specific vehicle inspections of the vehicle based on the unambiguous identification data;

communicating, by the mobile communication interface, the identification data to the first vehicle inspection device;

exchanging, by the mobile communication interface, information between the vehicle and the first vehicle inspection device;

disconnecting the first vehicle inspection device from the vehicle;

connecting a second vehicle inspection device to the vehicle and reading out the identification data from the mobile communication interface into the second vehicle inspection device at a second work station, wherein the mobile communication interface and the second inspection device are separate devices which are configured to be (i) selectively attached to one another and (ii) subsequently detached again;

carrying out a second set of inspections of the vehicle using the second vehicle inspection device, wherein the second vehicle inspection device has at least a second vehicle inspection module that carries out inspection-device specific vehicle inspections of the vehicle based on the unambiguous identification data;

communicating, by the mobile communication interface, the identification data to the second vehicle inspection device; and exchanging, by the mobile communication interface, information between the vehicle and the second vehicle inspection device, wherein at the first and the second work stations, identification data of vehicles located in mobile communication interfaces of the repair shop are displayed to a user of the first or second vehicle inspection device, and wherein the display of identification data at the first or second work station takes place as a function of the proximity of the vehicle having the connected mobile communication interface to the work station.

2. The method of claim 1, further comprising:

connecting a universal operating and display device to the vehicle and reading out the identification data from the mobile communication interface into the universal operating and display device; and carrying out other inspections of the vehicle using the universal operating and display device and the mobile communication interface connected to the vehicle at a third work station.

3. The method of claim 1, wherein at least one of the first vehicle inspection device the second vehicle inspection device or the universal operating and display device has a standardized diagnostic server device for establishing a communication with the mobile communication interface and through the mobile communication interface with electronic control units installed in the vehicle.

4. A mobile communication interface for identifying a vehicle and for communicating with electronic control units installed in the vehicle in a repair shop, comprising:

a connecting device that connects a vehicle in a repair shop to the mobile communication interface;

a memory device that stores identification data of the vehicle to be identified and connected; and a communication device that relays the identification data to vehicle inspection devices and that exchanges information between the electronic control units installed in the vehicle and the vehicle inspection devices at different work stations in the repair shop, wherein the vehicle inspection devices have different vehicle inspection modules that carry out inspection-device specific vehicle inspections of the vehicle based on the unambiguous identification data, wherein the mobile communication interface and the inspection devices are separate devices which are configured to be (i) selectively attached to one another and (ii) subsequently detached again, and wherein the display of identification data at the work stations takes place as a function of the proximity of the vehicle having the connected mobile communication interface to a respective work station.

5. The mobile communication interface of claim 4, wherein the mobile communication interface is moved along with the vehicle to be connected in the repair shop.

6. A system for identifying, diagnosing, maintaining, and repairing a vehicle in a repair shop, comprising:

a mobile communication interface to identify a vehicle and to communicate with electronic control units installed in the vehicle in a repair shop, including:

a connecting device that connects a vehicle in a repair shop to the mobile communication interface;

a memory device that stores identification data of the vehicle to be identified and connected; and a communication device that relays the identification data to the vehicle inspection devices and that exchanges information between the electronic control units installed in the vehicle and the vehicle inspection devices at different work stations in the repair shop; and a plurality of vehicle inspection devices, each including:

a diagnostic server device that establishes communication with the mobile communication interface and the electronic control units installed in the vehicle;

an operating and display device that controls the vehicle inspection device and the mobile communication interface; and different vehicle inspection modules that carry out inspection-device specific vehicle inspections of the vehicle based on the unambiguous identification data, wherein the mobile communication interface and the plurality of vehicle inspection devices are separate devices which are configured to be (i) selectively attached to one another and (ii) subsequently detached again, wherein at the work stations, identification data of vehicles located in mobile communication interfaces of the repair shop are displayed to a user of a respective vehicle inspection device, and wherein the display of identification data at the work stations takes place as a function of the proximity of the vehicle having the connected mobile communication interface to a respective work station.

7. The method of claim 1, wherein the at least one of the first vehicle inspection device or the mobile communication interface connected to the vehicle carries out the first set of inspections of the vehicle, and wherein the at least one of the second vehicle inspection device or the mobile communication interface connected to the vehicle carries out the second set of inspections of the vehicle.

* * * * *